United States Patent [19]
Baettig et al.

[11] Patent Number: 5,824,785
[45] Date of Patent: Oct. 20, 1998

[54] DYES FOR INK JET PRINTING

[75] Inventors: Kurt Baettig, Praroman; Gerald Jan, Villars-sur-Glane, both of Switzerland

[73] Assignee: Ilford Imaging Switzerland GmbH, Fribourg, Switzerland

[21] Appl. No.: 718,360

[22] PCT Filed: Feb. 5, 1996

[86] PCT No.: PCT/GB96/00300

§ 371 Date: Dec. 16, 1996

§ 102(e) Date: Dec. 16, 1996

[87] PCT Pub. No.: WO96/24636

PCT Pub. Date: Aug. 15, 1996

[30] Foreign Application Priority Data

Feb. 7, 1995 [GB] United Kingdom ................... 9502341

[51] Int. Cl.$^6$ ............................. C09B 29/08; C09D 11/00
[52] U.S. Cl. ......................................... 534/803; 106/31.48
[58] Field of Search .......................... 534/803; 106/22 K, 106/31.48

[56] References Cited

U.S. PATENT DOCUMENTS 4,777,248 10/1988 Greenwood .............................. 534/803

*Primary Examiner*—Fiona T. Powers
*Attorney, Agent, or Firm*—Ostrager Chong Flaherty & Onofrio

[57] ABSTRACT

There is described a new magenta azo dye which can be used in an aqueous composition in an ink-jet printing process.

8 Claims, No Drawings

DYES FOR INK JET PRINTING

This application is a 371 of PCT/GB96/00300 filed Feb. 5, 1996.

FIELD OF THE INVENTION

The present invention relates to dyes and aqueous Ink compositions comprising these dyes for ink jet printing processes.

Ink jet printing systems generally are of two types: continuous stream and drop-on-demand. In continuous stream ink jet systems, ink is emitted in a continuous stream under pressure through an orifice or nozzle. The stream is perturbed, causing it to break up into droplets at a fixed distance from the orifice. At the break up point, the droplets are charged in accordance with digital data signals and passed through an electrostatic field which adjusts the trajectory of each droplet in order to direct it to a waste ink collecting vessel (e.g. for recirculation) or a specific location on a recording medium. In drop-on-demand systems, a droplet is expelled from an orifice to a position on a recording medium in accordance with digital data signals. A droplet is not formed or expelled unless it is to be placed on the recording medium.

The most important part of an ink used in ink jet printing are the dyes. Although a number of dyes have been proposed non has been produced which meets all the requirements of a modern printing process.

BACKGROUND OF THE INVENTION

Reactive dyes with incorporated 1,3,5-triazine structural elements are common in textile printing and have also been proposed for ink jet printing. Such dyes are for several reasons in general not too well suited for this application. The reactive groups are not very stable over prolonged periods in aqueous solutions. Dyes containing such reactive groups are moreover, due to their potential health risk, less suitable for handling in a non industrial environment. Non reactive dyes of this kind have been described in U.S. Pat. No. 4,771,129 (K. Hideo) and U.S. Pat. No. 4,777,248 (D. Greenwood). In particular dyes of the following structural formulas have been described:

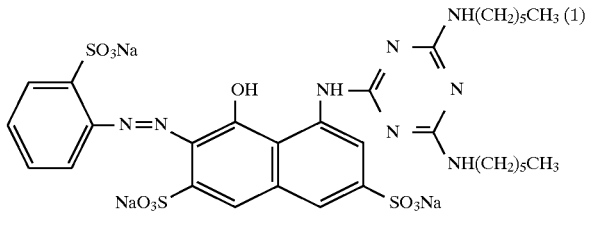

USP 4'771'129 (dye 5)

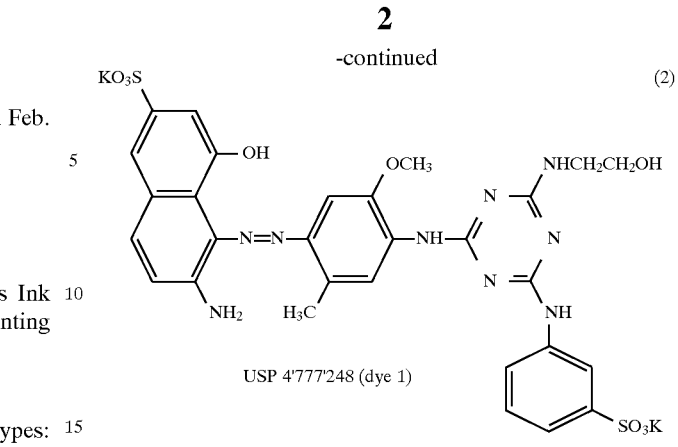

USP 4'777'248 (dye 1)

In some of these dyes particularly enhanced water-solubility has been claimed to be due to the introduction of elements of the following structure

and in some cases water solubility seems still to be improved by introduction of elements of the structure

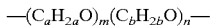

(U.S. Pat. No. 4,777,248) into the triazine part of the dye.

These dyes are however still inadequate when used in aqueous inks of modern ink jet printers. In particular printers of the continuous-stream type are highly demanding as far as physical properties of the inks are concerned. Particularly critical are storage stability of the inks without forming degradation products prone to clog the nozzles of the printer. Printers are today able to print images of high density rapidly. Therefore highly concentrated inks are needed in order to avoid the jetting of high water volumes onto the receiving layer. These high concentrations should ideally, for environmental reasons, be achieved without the use of organic cosolvents. Such inks can only be prepared with dyes having a particularly high water solubility.

Dyes of the above mentioned structures which are the state of the art, are in general not soluble enough to satisfy the required demanding conditions. It is the aim of this invention to provide dyes with the required high water solubility.

DESCRIPTION OF THE INVENTION

This invention relates to azo dyes of the formula (4)

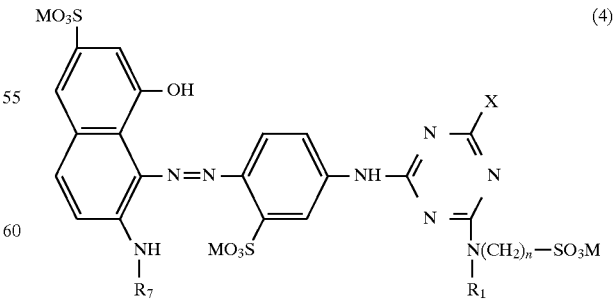

wherein:

$R_1$ is selected from hydrogen or an aliphatic radical having from 1 to 6 C atoms;

n is 2, 3 or 4;

X is $NR_3R_4$ where $R_3$ and $R_4$ are independently selected from hydrogen, alkyl from 1 to 6 C atoms, C2 to C6 substituted alkyl where the substituents are selected from OH, $OCH_3$, COOM, $SO_3M$; aralkyl; unsubstituted aryl or an aryl substituted by COOM or $SO_3M$;

$R_3$ and $R_4$ may form a ring without or with inclusion of a hetero atom;

or

X is $SR_5$ in which $R_5$ is alkyl from 1 to 6 C atoms, C2 to C6 substituted alkyl where the substituents are selected from OH, $OCH_3$, COOM, $SO_3M$;

or

X is $OR_6$ in which $R_6$ is hydrogen or an aliphatic radical having from 1 to 6 C atoms;

$R_7$ is hydrogen, alkyl of 1 to 6 C atoms, C2 to C6 substituted alkyl where the substituents are selected from CN, COOM, OH, $COOCH_3$, $COOCH_2CH_3$, $COCH_3$; unsubstituted aryl or aryl substituted by $CH_3$, halogen;

M is hydrogen, a metal atom, an ammonium or ammonium substituted with alkyl, alkoxyalkyl and hydroxyalkyl each having 1 to 12 C atoms.

The azo dyes of the present invention comprise no reactive groups. They are of particular use in inks used for ink-jet printing because of their high water solubility.

DYE SYNTHESIS

One method of preparing dyes of the present invention is by (i) Reacting the known (U.S. Pat. No. 3,787,215) monoazo compound of formula (5)

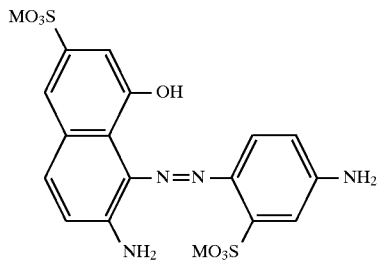

(5)

with cyanuric chloride under conditions such that one chlorine atom of the triazine is displaced by the monoazo compound of formula (5) then (ii) reacting the mono-substituted dichloro-triazine with a compound of formula (6)

(6)

under conditions such that a second atom of chlorine is displaced by the compound of formula (6) and (iii) reacting finally the di-substituted triazine with a compound XH under conditions that the third chlorine atom is displaced by X.

Where X is a compound of formula (6), the second and third chlorine atoms of the triazine nucleus may be replaced simultaneously.

The present invention is illustrated by the following example.

EXAMPLE 1

Preparation of the Compound No.100 (Na-salt)

Step 1

48.3 g (0,1 mol) monoazo compound (5) was added to water (600 ml) and the pH adjusted to 8 by addition of 30% aq. sodium hydroxide solution.

A solution of cyanuric chloride (20.3 g, 0,11 mol) in ethyl acetate (100 ml) was added maintaining the pH at 7 to 8 and the temperature at 15°–20° C. After 30 minutes a solution of 2-aminoethane-sulfonic acid, sodium salt (17.8 g, 0,12 mol) in water (120 ml) was added to the reaction mixture while maintaining the pH at 7–7.5 and the temperature at 30° C. After 30 minutes the reaction mixture was heated to 50° C. and stirred for 1 hour at this temperature, cooled to room temperature and then the product was filtered.

Step 2

The wet product (200 g) from step 1 was added to a solution of 1-methyl-2-pyrrolidinone (200 ml) and 2-(methylamino)ethanol (18 g, 0.24 mol). The reaction mixture was heated to 90° C. for 3 hours and cooled to room temperature. A solution of 12 g of sodium acetate in ethanol (400 ml) was added to the reaction mixture. The solid was collected by filtration, washed with ethanol (300 ml), dried in vacuum at 60° C. to yield the magenta dye (64 g) of formula No. 100.

In an analogous manner using appropriate starting materials the dyes described in Tables 1 and 2 can be obtained.

The dyes of general formula

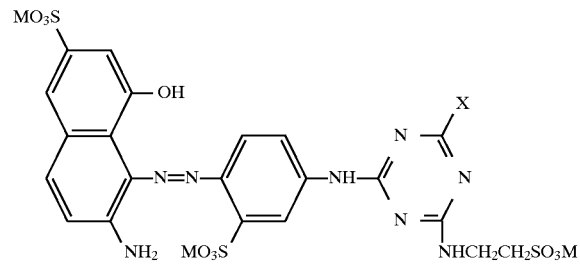

were made wherein the substituents are:

TABLE 1

| Compound No. | X | M | λ max (nm) in $H_2O$ |
|---|---|---|---|
| 100 | $N(CH_3)CH_2CH_2OH$ | Na | 519 |
| 101 | $N(CH_2CH_2OH)_2$ | Na | 518 |
| 102 | $NHCH_2CH_2SO_3Na$ | Na | 516 |
| 103 | $S(CH_2)_3SO_3K$ | K | 518 |
| 104 | $SCH_2CH_2OH$ | Na | 516 |
| 105 | OH | Na | 516 |
| 106 | $SCH_2COOK$ | K | 517 |
| 107 | $OCH_2CH_3$ | Na | 515 |

The dyes of general formula

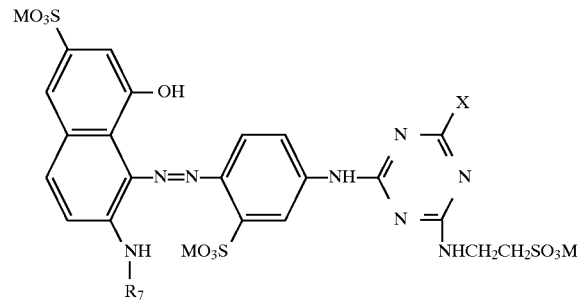

were made wherein the substituents are:

TABLE 2

| Compound No. | $R_7$ | X | M | λmax (nm) in $H_2O$ |
|---|---|---|---|---|
| 200 | $CH_2CH_2CN$ | $N(CH_3)CH_2CH_2OH$ | Na | 528 |
| 201 | $CH_2CH_2CN$ | $SCH_2CH_2OH$ | Na | 526 |

Example 2

The dyes of the present invention are specially adapted for the preparation of inks. Inks for ink jet printing are well known. These inks consist in essence of a liquid vehicle dissolved therein a dye. The liquid vehicle of the inks employed for the printing consists in general of water or a mixture of water and a miscible organic solvent such as C1–C4 alkanols, alkylene glycols such as di(propylene glycol), di(ethylene glycol), polyols such as 1,5-pentanediol, gycerol, 1,2,6-trihydroxyhexane, nitrogen-containing solvents such as 2-pyrrolidinone, N-methyl-2-pyrrolidinone, 1-(2-hydroxyethyl)-2-pyrrolidinone, 1,3-dimethyl-2-imidazolidinone, 1,1,3,3-tetramethylurea or sulfur containing solvents such as organosulfoxides, sulfolane and the like.

The non water parts of the printing ink generally serve as humefactant, cosolvent, viscosity regulating agent, ink penetration additive, levelling agent or drying agent.

In addition aqueous inks may contain miscellaneous known additives like viscosity modifiers, such as cellulose derivatives and other water-soluble resins, various kinds of surfactants, surface tension modifiers, optical brighteners, UV absorbers, light stabilisers, biocides and pH conditioners, such as buffers.

Inks for use in ink jet recording of the type based on continuous-stream usually contain an inorganic salt as electrolyte, such as sodium/ammonium/lithium halogenides or sulphate.

This description of inks is for illustration only and is not to be considered as limiting the invention.

The present invention in so far as it relates to inks is further illustrated with reference to the following examples in which all parts and percentages are by weight.

Inks were prepared, using the dyes 100 to 102, as described above, according to the following recipe:

|  |  |
|---|---|
| dye | 6 parts |
| glycerol | 20 parts |
| water | 74 parts |

The inks were prepared by dissolving the ingredients and filtering the solution under pressure through a Millipore filter (0,5 micron).

The inks were tested and shown to satisfy all the requirements specifying a usable ink. In particular they were shown to meet the following criteria:

(1) Physical properties of the ink, such as viscosity, conductivity and surface tension, are each within a defined range.
(2) All dyes have good solubility in the ink medium to give solutions having good stability which do not plug the fine ejecting orifices.
(3) The recording agent gives images of sufficient optical density.
(4) The ink does not change physical properties or deposit solid matter during storage.
(5) Printing can be performed without a restriction on the nature of substrate.
(6) The ink exhibits a high rate of fixation.
(7) The ink gives images of good resistance to water, light and abrasion.

Example 3

The solubilities of the dyes according to the invention were determined as follows:

An excess of dye was heated at 50° C. in water with stirring for one hour. The mixture was then cooled down to 20° C. and filtered, and the dye content of the clear solution was determined spectroscopically. The results obtained are shown in table 3

TABLE 3

| Dye No | Solubility (in g per 100 ml) |
|---|---|
| 100 | 35 |
| 101 | 32 |
| 102 | 26 |
| dye 1 | 20 |
| dye 5 | 15 |

The dyes 1 and 5 are known from U.S. Pat. No. 4,777,248 and U.S. Pat. No. 4,771,129 es heretofore set forth.

The results in table 3 show the significantly higher solubility of the dyes according to the invention compared to dyes of the prior art.

We claim:

1. An azo dye of formula (4)

$$MO_3S\text{-naphthalene(OH)(NH-R}_7)\text{-N=N-phenyl(MO}_3S)\text{-NH-C(X)=N-triazine-N(CH}_2)_n\text{-SO}_3M, R_1 \quad (4)$$

wherein $R_1$ is selected from hydrogen or an aliphatic radical having from 1 to 6 C atoms;

n is 2,3 or 4;

X is $NR_3R_4$ where $R_3$ and $R_4$ are independently selected from hydrogen, alkyl from 1 to 6 C atoms, C2 to C6 substituted alkyl where the substituents are selected from OH, $OCH_3$, COOM, $SO_3M$; aralkyl; unsubstituted aryl or an aryl substituted by COOM or $SO_3M$;

$R_3$ and $R_4$ form a ring without or with inclusion of a hetero atom;

or

X is $SR_5$ in which $R_5$ is alkyl from 1 to 6 C atoms, C2 to C6 substituted alkyl where the substituents are selected from OH, $OCH_3$, COOM, $SO_3M$;

or

X is $OR_6$ in which $R_6$ is hydrogen or an aliphatic radical having from 1 to 6 C atoms;

$R_7$ is hydrogen, alkyl of 1 to 6 C atoms, C2 to C6 substituted alkyl where the substituents are selected from CN, COOM, OH, COOCH$_3$, COOCH$_2$CH$_3$, COCH$_3$; unsubstiuted aryl or aryl substituted by CH$_3$, halogen;

M is hydrogen, a metal atom, an ammonium or ammonium substituted with alkyl, alkoxyalkyl and hydroxyalkyl each having 1 to 12 C atoms.

2. An azo dye according to claim 1 where $R_1$ is hydrogen and where

X, n, $R_3$ to $R_7$ and M are as set forth in claim 1.

3. An azo dye according to claim 2 where n is 2 or 3;

$R_3$, $R_4$ are independently selected from hydrogen, C1 to C6 alkyl, C2 to C6 substituted alkyl where the substituents are selected from OH, OCH$_3$, COOM, SO$_3$M or $R_5$, R6 form a 5- or 6-membered ring without or with inclusion of a hetero atom;

$R_5$ is a C1 to C4 substituted alkyl where the substituents are selected from OH, COOM or SO$_3$M;

$R_6$ is hydrogen, CH$_3$ or CH$_2$CH$_3$;

$R_7$, M are as set forth in claim 1.

4. An azo compound according to claim 3 where $R_7$ is selected from hydrogen, C1 to C3 alkyl or C2 or C3 substituted alkyl where the substituents are CN or COOM.

5. An azo dye according to claim 4 where $R_5$ is CH$_2$CH$_2$OH, CH$_2$COOM or (CH$_2$)$_3$SO$_3$M;

$R_6$ is hydrogen;

M is hydrogen, alkali metal atom, ammonium or ammonium substituted with C1 to C2 alkyl or with CH$_2$CH$_2$OH.

6. An azo dye according to formula (7)

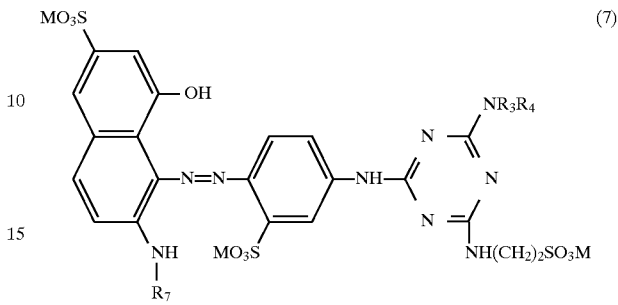

where $R_3$, $R_4$ are independently selected from hydrogen or C2 to C3 substituted alkyl where the substituents are selected from OH, COOM or SO$_3$M;

$R_7$ is hydrogen, CH$_2$CH$_2$CN or CH$_2$CH$_2$COOM and

M is hydrogen, alkali metal or ammonium ion.

7. An ink comprising a dye or a mixture of dyes as described in anyone of claims 1 to 6.

8. An ink which contains in addition to a dye or dyes as claimed in anyone of claims 1 to 6 one or more other dyes.

* * * * *